(12) United States Patent
Park et al.

(10) Patent No.: US 11,196,043 B2
(45) Date of Patent: Dec. 7, 2021

(54) SILICON-BASED PARTICLE-POLYMER COMPOSITE AND NEGATIVE ELECTRODE ACTIVE MATERIAL COMPRISING THE SAME

(71) Applicant: LG CHEM, LTD., Seoul (KR)

(72) Inventors: Se Mi Park, Daejeon (KR); Je Young Kim, Daejeon (KR); Yong Ju Lee, Daejeon (KR); Rae Hwan Jo, Daejeon (KR); Su Min Lee, Daejeon (KR); Jung Hyun Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 16/766,138

(22) PCT Filed: Nov. 22, 2018

(86) PCT No.: PCT/KR2018/014472
§ 371 (c)(1),
(2) Date: May 21, 2020

(87) PCT Pub. No.: WO2019/103498
PCT Pub. Date: May 31, 2019

(65) Prior Publication Data
US 2020/0365882 A1    Nov. 19, 2020

(30) Foreign Application Priority Data

Nov. 24, 2017 (KR) .......................... 10-2017-0158626

(51) Int. Cl.
*H01M 4/36* (2006.01)
*H01M 4/38* (2006.01)
(Continued)

(52) U.S. Cl.
CPC .......... *H01M 4/366* (2013.01); *H01M 4/386* (2013.01); *H01M 4/628* (2013.01); *H01M 10/0525* (2013.01); *H01M 2004/021* (2013.01)

(58) Field of Classification Search
CPC ..... C08J 3/20; C08K 3/08; C08K 3/34; C08K 3/36; C08L 33/06; H01M 10/0525;
(Continued)

(56) References Cited

U.S. PATENT DOCUMENTS 10,050,275 B2 *  8/2018  Loveridge ............. H01M 4/622
2007/0087267 A1  4/2007  Kim et al.
(Continued)

FOREIGN PATENT DOCUMENTS

JP    H06-325752 A    11/1994
JP    2009-076433 A    4/2009
(Continued)

OTHER PUBLICATIONS

International Search Report (with partial translation) and Written Opinion issued in corresponding International Patent Application No. PCT/KR2018/014472, dated Feb. 27, 2019.

*Primary Examiner* — Mark Kopec
*Assistant Examiner* — Jaison P Thomas
(74) *Attorney, Agent, or Firm* — Morgan, Lewis & Bockius LLP

(57) ABSTRACT

The present invention relates to a silicon-based particle-polymer composite, which includes silicon-based particles; and a polymer coating layer formed on the silicon-based particles, in which the polymer coating layer includes metal-substituted poly(acrylic acid) in which hydrogen atoms in carboxyl groups of the poly(acrylic acid) chain are substituted with one or more selected from the group consisting of K, Na and Li.

10 Claims, 1 Drawing Sheet

(51) Int. Cl.
*H01M 4/62* (2006.01)
*H01M 10/0525* (2010.01)
*H01M 4/02* (2006.01)

(58) Field of Classification Search
CPC .......... H01M 10/26; H01M 2004/021; H01M 2220/30; H01M 2300/0014; H01M 4/244; H01M 4/366; H01M 4/386; H01M 4/62; H01M 4/628; Y02E 60/10
See application file for complete search history.

(56) References Cited

U.S. PATENT DOCUMENTS

| | | |
|---|---|---|
| 2015/0125744 A1 | 5/2015 | Hosaka et al. |
| 2015/0140423 A1* | 5/2015 | Brown .................. H01M 4/583 |
| | | 429/213 |
| 2015/0280221 A1 | 10/2015 | Abdelsalam et al. |
| 2018/0145312 A1* | 5/2018 | Koike .................. H01M 4/386 |

FOREIGN PATENT DOCUMENTS

| | | | | |
|---|---|---|---|---|
| JP | 2012-164624 A | 8/2012 | | |
| JP | 2015-090845 A | 5/2015 | | |
| JP | 6215804 B2 | 10/2017 | | |
| KR | 10-2007-0036732 A | 4/2007 | | |
| KR | 10-2015-0027093 A | 3/2015 | | |
| KR | 10-2015-0086288 A | 7/2015 | | |
| WO | WO-2016204565 A1 * | 12/2016 | ............ H01M 4/587 |
| WO | 2017/026269 A1 | 2/2017 | | |

\* cited by examiner

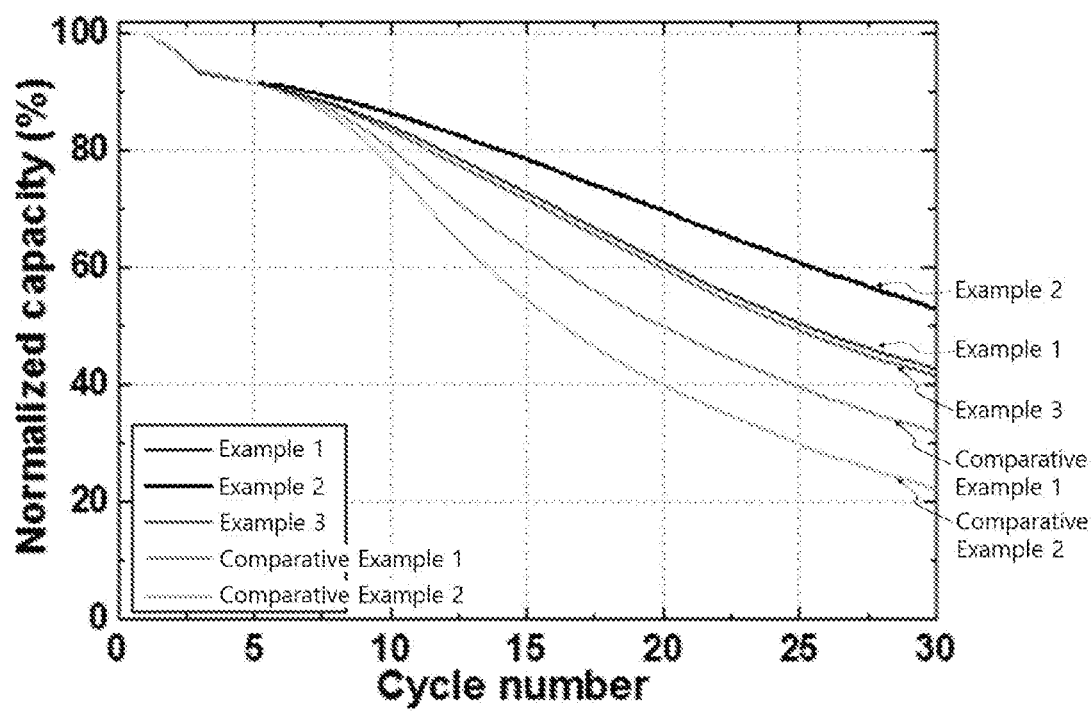

SILICON-BASED PARTICLE-POLYMER COMPOSITE AND NEGATIVE ELECTRODE ACTIVE MATERIAL COMPRISING THE SAME

CROSS-REFERENCE TO RELATED APPLICATION

This application claims priority to and the benefit of Korean Patent Application No. 10-2017-0158626, filed on Nov. 24, 2017, the disclosure of which is incorporated herein by reference in its entirety.

TECHNICAL FIELD

The present invention relates to a silicon-based particle-polymer composite, and a negative electrode active material comprising the same, and more particularly, to a silicon-based particle-polymer composite, which can further enhance the performance of a lithium secondary battery when being included in a negative electrode active material, by reducing volume expansion according to the intercalation of lithium ions and preventing direct contact between a silicon oxide and an electrolyte solution, and a negative electrode active material comprising the same.

BACKGROUND ART

According to technology development and increasing demand for various devices, the demand for a secondary battery as an energy source is rapidly increasing, and among secondary batteries, a lithium secondary battery having a high energy density and a high operating potential, a long cycle lifespan and a low self-discharge rate has been commercialized and widely used.

A lithium secondary battery is a secondary battery which generally consists of a positive electrode including a positive electrode active material, a negative electrode including a negative electrode active material, a separator and an electrolyte and charges and discharges by the intercalation-deintercalation of lithium ions. Since the lithium secondary battery has a high energy density, a high electromotive force, and high capacity, it is applied to various fields.

Meanwhile, as a positive electrode active material constituting a positive electrode of a lithium secondary battery, a metal oxide such as $LiCoO_2$, $LiMnO_2$, $LiMn_2O_4$ or $LiCrO_2$ is used, and as a negative electrode active material constituting a negative electrode, a carbon-based material such as lithium metal, graphite or activated carbon, or a material such as a silicon oxide ($SiO_x$) is used. Among these, previously, lithium metal was mainly used. However, as charge and discharge cycles progress, a phenomenon in which a lithium atom on the surface of lithium metal is grown, resulting in damage to a separator and a battery, occurs, and therefore a carbon-based material is recently being mainly used. However, it has a disadvantage in that a theoretical capacity is small, that is, only about 400 mAh/g.

Accordingly, various studies for replacing the carbon-based material with silicon (Si) having a high theoretical capacity (4,200 mAh/g) as a negative electrode active material are progressing. A reaction formula when lithium is intercalated into silicon is as follows:

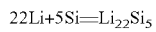
[Reaction Formula 1]

However, in most silicon negative electrode active materials, a silicon volume expands up to 300% due to lithium intercalation, and thus a negative electrode is damaged and does not exhibit a high cycle characteristic. In addition, in the case of silicon, as cycles continue, the volume expansion occurs due to the lithium intercalation, and fading mechanisms such as pulverization, contact losses with conducting agents and a current collector, and unstable solid-electrolyte solution-interphase (SEI) formation may be exhibited.

Accordingly, to solve the above-described problems, studies using a silicon nanostructure which is controlled in structure, for example, formation of a nanowire, a nanotube, a nanoparticle, a porous structure and a complex with a carbon-based material have been reported. As an example, although a carbon-coated silicon nanostructure has been studied, a capacity of the negative electrode active material was not retained as charge/discharge cycles for a lithium secondary battery using the carbon-coated silicon nanostructure as a negative electrode active material were repeated. However, although studies on the synthesis of a porous carbon-silicon composite have been conducted, they reveal the limitations of the technology of controlling the conformation of a complicated structure and the technology of synthesizing a composite due to high processing costs.

Therefore, there is still a demand for the development of a silicon-containing composite which can be relatively easily mass-produced at low cost and solve problems caused by the use of conventional silicon and a method of preparing the same.

DISCLOSURE OF THE INVENTION

Technical Problem

The present invention is directed to providing a silicon-based particle-polymer composite, which can further enhance the performance of a lithium secondary battery by reducing volume expansion caused by the intercalation of lithium ions.

The present invention is also directed to providing a negative electrode for a lithium secondary battery, which includes the silicon-based particle-polymer composite.

The present invention is also directed to providing a lithium secondary battery, which includes the above-described negative electrode.

Technical Solution

To solve the above-described objects, the present invention provides a silicon-based particle-polymer composite, which includes: silicon-based particles; and a polymer coating layer formed on the silicon-based particles. Here, the polymer coating layer includes a metal-substituted poly(acrylic acid) in which hydrogen(s) in carboxyl groups of the poly(acrylic acid) chain is(are) substituted with one or more selected from the group consisting of K, Na and Li.

In addition, the present invention provides a negative electrode for a lithium secondary battery, which includes the silicon-based particle-polymer composite, and a lithium secondary battery including the negative electrode.

Advantageous Effects

A silicon-based particle-polymer composite of the present invention can exhibit a high lifespan characteristic by reducing the volume expansion according to the intercalation of lithium ions, and solve the problem of a side reaction with an electrolyte solution by preventing direct contact between a silicon oxide and an electrolyte solution. Therefore, the performance of a lithium secondary battery can be further enhanced.

DESCRIPTION OF DRAWINGS

The accompanying drawings, which are incorporated in the specification, illustrate exemplary embodiments of the present invention, and serve to further aid in understanding the technical idea of the present invention together with the above description of the present invention, and thus it should not be construed as being limited to the material described in such drawings.

FIG. 1 is a graph showing the cycle characteristics for batteries produced in Examples 1 to 3 and Comparative Examples 1 and 2, respectively.

MODE FOR CARRYING OUT THE INVENTION

Hereinafter, the present invention will be described in further detail to help in understanding the present invention.

The present invention will be described in further detail to help understanding of the present invention. Here, terms and words used in the specification and claims should not be construed as limited to general or dictionary meanings, and should be interpreted with the meaning and concept in accordance with the technical idea of the present invention based on the principle that the inventors have appropriately defined the concepts of terms in order to explain the invention in the best way.

The silicon-based particle-polymer composite of the present invention includes silicon-based particles; and a metal-substituted poly(acrylic acid) coating layer formed on the silicon-based particles. Here, the polymer coating layer includes a metal-substituted poly(acrylic acid) in which hydrogen(s) in carboxyl groups of the poly(acrylic acid) chain is(are) substituted with one or more metals selected from the group consisting of K, Na and Li.

In the silicon-based particle-polymer composite according to an exemplary embodiment of the present invention, the silicon-based particles are included in the silicon-based particle-polymer composite, thereby forming a core in the silicon-based particle-polymer composite.

The silicon-based particles may include a mixture of one or more selected from the group consisting of Si, silicon oxide particles ($SiO_x$, $0<x\leq2$), a Si-metal alloy and a silicon-carbon composite, and specifically, silicon oxide particles ($SiO_x$, $0<x\leq2$). In addition, the silicon oxide particles may be a complex consisting of amorphous $SiO_2$ and crystalline Si, and in this case, the silicon oxide particles may be $SiO_{x'}$, ($0<x'<2$).

The silicon-based particle may be a silicon-based particle formed as one mass, and alternatively, a silicon-based secondary particle formed by aggregating silicon-based primary particles with a small particle size, or both of the two different types of particles.

The average particle size ($D_{50}$) of the silicon-based particles may be 0.05 to 30 μm, specifically, 0.5 to 15 μm, and more specifically, 1 to 10 μm, and the silicon-based particles may be included at 70 to 99 parts by weight, and specifically, 80 to 99 parts by weight based on 100 parts by weight of the silicon-based particle-polymer composite.

The metal-substituted poly(acrylic acid) coating layer may be formed on the silicon-based particles, and specifically, formed on the outer surface of the silicon-based particles.

The polymer coating layer may be formed on the silicon-based particles to prevent or alleviate the pulverization of the silicon-based particles when the volume of the silicon-based particles is changed by the intercalation and deintercalation of lithium into and from the silicon-based particles, and may coat the silicon-based particles so as to prevent contact between the silicon-based particles and an electrolyte by coating the silicon-based particles, thereby effectively preventing or alleviating a side reaction of the electrolyte. In addition, the polymer coating layer imparts excellent conductivity and an excellent adhesive property to the silicon-based particle-polymer composite, such that the silicon-based particle-polymer composite may easily react with lithium when being used as a negative electrode active material for a lithium secondary battery, and a negative electrode may exhibit an excellent lifespan characteristic.

The poly(acrylic acid) (PAA) may be represented by Formula 1 below, and the metal-substituted PAA may be prepared by substituting hydrogen atoms in a carboxyl group of the PAA chain with a metal such as K, Na or Li. The metal-substituted PAA is specifically a K-substituted PAA, a Na-substituted PAA, or a mixture thereof.

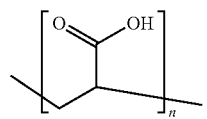

[Formula 1]

In Formula 1, n is an integer of 2 or more, and specifically, may be 30 to 60,000.

In addition, the PAA of the metal-substituted PAA may have a weight average molecular weight (Mw) of 2,000 to 4,000,000, specifically, 250,000 to 3,000,000, and more specifically, 450,000 to 2,000,000. When the metal-substituted PAA has the above-described weight average molecular weight (Mw), hydrogen atoms in a carboxyl group of the PAA chain may be easily substituted with a metal, and even in the preparation of an electrode, a polymer coating layer formed on silicon-based particles may be suitably maintained. When the weight average molecular weight of the PAA is less than the above range, there is a possibility that the polymer coating layer is separated from silicon-based particles when an electrode of an aqueous composition is prepared, and when the weight average molecular weight is more than the above range, it is difficult to perform metal substitution due to a very high viscosity.

When the PAA is dissolved in an aqueous solvent for coating, polymers are aggregated by hydrogen bonding, and therefore, when a polymer coating layer is formed using the PAA, the uniformity of the coating layer may be degraded. However, when hydrogen atom(s) in carboxyl groups of the PAA chain is(are) substituted with one or more metals selected from the group consisting of K, Na and Li, the polymer chain is transformed into a stretched polymer chain due to a repulsive force in-between the polymer, and thus the aggregation issue is resolved. As a result, a uniform polymer coating layer may be formed.

That is, in the silicon-based particle-polymer composite of the present invention, the polymer coating layer includes one or more metal-substituted PAAs selected from the PAAs in which hydrogen atoms in a carboxyl group of a PAA chain is substituted with K, Na or Li, and in the metal-substituted PAA, there is no aggregation between the PAA chains, so that the uniform polymer coating layer may be formed on the surface of the silicon-based particles.

In the silicon-based particle-polymer composite according to an exemplary embodiment of the present invention, the metal-substituted PAA may be prepared by substituting 10% to 100%, specifically, 30 to 100% of hydrogen atoms in carboxyl groups of the PAA chain with one or more selected from the group consisting of K, Na and Li. When the above range of hydrogen atoms in carboxyl groups of the PAA chain are substituted with metal(s), a PAA coating layer may be uniformly formed on the surface of silicon-based particles due to a suitable dispersion effect.

Meanwhile, the metal-substituted PAA may have a rate of substituted hydrogen atoms (metal substitution rate) among all hydrogen atoms in carboxyl groups of the PAA chain, which may vary depending on a metal type. In the present invention, the percent (%) used to indicate the metal substitution rate refers to mol %.

In the silicon-based particle-polymer composite according to an exemplary embodiment of the present invention, when hydrogen atoms in a carboxyl group of the PAA chain are substituted with K, the PAA may be metal-substituted PAA in which 10 to 100%, specifically, 30 to 90%, and more specifically, 50 to 70% of the hydrogen atoms in carboxyl groups of the PAA chain are substituted with K.

In addition, in the silicon-based particle-polymer composite according to an exemplary embodiment of the present invention, PAA in which hydrogen atoms in a carboxyl group of the PAA chain are substituted with Na may be metal-substituted PAA in which 10 to 100%, specifically, 50 to 100%, and more specifically, 70 to 90% of the hydrogen atoms in carboxyl groups of the PAA chain are substituted with Na.

In addition, in the silicon-based particle-polymer composite according to an exemplary embodiment of the present invention, PAA in which hydrogen atoms in a carboxyl group of the PAA chain are substituted with Li may be metal-substituted PAA in which 10 to 100%, specifically, 60 to 100%, and more specifically, 80 to 100% of the hydrogen atoms in carboxyl groups of the PAA chain are substituted with Li.

When hydrogen in a carboxyl group of the PAA chain is substituted with K, Na or Li, in the case of the above range of hydrogen atoms among the hydrogen atoms in the carboxyl groups of the PAA chain being substituted in the above range, the metal-substituted PAA may exhibit more excellent coating uniformity, and therefore, a battery including the same may exhibit more excellent performance.

The thickness of the polymer coating layer may be 50 to 500 nm, specifically, 70 to 300 nm, and more specifically, 35 to 100 nm.

When the thickness of the polymer coating layer satisfies the above range, pulverization of the silicon-based particles may be suitably prevented or alleviated according to a volume change of the silicon-based particles, a side reaction of the silicon-based particles with an electrolyte solution may be prevented, and the polymer coating layer may not reduce the intercalation and deintercalation efficiencies of lithium.

The polymer coating layer may be included at 0.1 to 30 parts by weight, specifically, 0.5 to 25 parts by weight, and more specifically, 1 to 10 parts by weight with respect to 100 parts by weight of the silicon-based particle-polymer composite.

Since the content of the polymer coating layer is proportional to the thickness of the polymer coating layer, when the content of the polymer coating layer satisfies the above range, pulverization of the silicon-based particles may be suitably prevented or alleviated according to a volume change of the silicon-based particles, a side reaction of the silicon-based particles with an electrolyte solution may be prevented, and the polymer coating layer may not interfere with the intercalation and deintercalation of lithium.

The polymer coating layer may be a single layer, or a multi-layer in which two or more coating layers are stacked.

When the polymer coating layer is a multi-layer, two or more coating layers constituting the multi-layer may include the same type of metal-substituted PAAs, or different types of metal-substituted PAAs, wherein the two or more coating layers may have the same or different thicknesses.

When each layer constituting the multi-layer includes metal-substituted PAA having different components, different types of metal-substituted PAAs are suitably stacked so as to exhibit desired physical properties of the silicon-based particle-polymer composite prepared by combining polymers, and the thickness of each layer is adjusted so as to combine degrees of physical properties obtained from each metal-substituted PAA.

When the polymer coating layer is formed in a multi-layer, the thickness ratio between the layers may be determined to be in a range of 1:1 to 1:9, and specifically, 1:1 to 1:5. When the polymer coating layer is formed in a multi-layer, and each layer satisfies the above-described thickness ratio, the characteristics of different types of metal-substituted PAAs, which are included in respective layers, may be suitably combined.

The polymer coating layer may include pores to facilitate the intercalation and deintercalation of lithium, and the pore may have a diameter (average pore size) of 0.01 to 10 nm, specifically, 0.5 to 10 nm, and more specifically, 1 to 6 nm, which is measured at the surface of the polymer coating layer. When the average size of the pore satisfies the above range, an electrolyte solution may suitably penetrate through the pore, a side reaction between the electrolyte solution and the silicon particles may be controlled to a suitable level, and a suitable space for alleviating the volume expansion of the silicon-based particles may be ensured.

The silicon-based particle-polymer composite may have an average particle size ($D_{50}$) of 0.05 to 40 μm, specifically, 0.5 to 20 μm, and more specifically, 1 to 10 μm.

When the average particle size of the silicon-based particle-polymer composite satisfies the above range, the silicon-based particle-polymer composite may exhibit a suitable level or higher of electrode density and have a suitable capacity per volume, and a slurry for forming an electrode may be suitably applied to a uniform thickness.

In the present invention, the average particle size ($D_{50}$) of each of the silicon-based particles and the silicon-based particle-polymer composite may be defined as a particle size at 50% of a particle size distribution. The average particle size may be measured using a laser diffraction method or a scanning electron microscope (SEM) image without particular limitation. The laser diffraction method generally enables measurement of a particle size in a range from submicrons to several mm, and may obtain a result with high reproducibility and high resolution.

In the present invention, the silicon-based particle-polymer composite may be prepared by coating the silicon-based particles with a metal-substituted PAA material constituting the polymer coating layer.

The metal-substituted PAA material may be prepared through acid-base neutralization titration using PAA and a base solution of K, Na or Li, for example, KOH, NaOH or LiOH, and a metal substitution rate of hydrogen atoms in a carboxyl group of the PAA may be controlled by calculating a suitable equivalence ratio for substituting hydrogen atoms in a carboxyl group of the PAA and performing a reaction using the same.

The silicon-based particle-polymer composite according to an exemplary embodiment of the present invention may be used, as a negative electrode active material, alone or in combination with carbon and/or a material that can be alloyed with lithium. Since the silicon-based particle-polymer composite may exhibit a high lifespan characteristic because of a decrease in volume expansion caused by the intercalation of lithium ions, it may be effectively used to prepare a negative electrode active material of a secondary battery.

The material that can be alloyed with lithium may be one or more selected from the group consisting of Si, SiO, Sn, $SnO_x$, Ge, $GeO_x$, Pb, $PbO_x$, Ag, Mg, Zn, $ZnO_x$, Ga, In, Sb and Bi.

Accordingly, the present invention provides a negative electrode active material including a silicon-based particle-polymer composite, a negative electrode including the negative electrode active material, and a lithium secondary battery including the negative electrode. The lithium secondary battery may include a positive electrode, a negative electrode, and a separator interposed between the positive electrode and the negative electrode.

The negative electrode may be prepared by a conventional method known in the art, for example, by preparing a slurry for a negative electrode active material by mixing and stirring the negative electrode active material and additives such as a binder and a conductive material, and coating a negative electrode collector with the slurry, followed by drying and pressing.

The binder may be used to maintain a molded body by cohesion of particles of the negative electrode active material, and the binder is no particularly limited as long as it is a conventional binder used in the preparation of a slurry for a negative electrode active material. For example, a non-aqueous binder such as polyvinyl alcohol, carboxymethylcellulose, hydroxypropylenecellulose, diacetylenecellulose, polyvinyl chloride, polyvinylpyrrolidone, polytetrafluoroethylene (PTFE), polyvinylidene fluoride (PVdF), polyethylene or polypropylene may be used, and alternatively, an aqueous binder such as one or a mixture of two or more selected from the group consisting of acrylonitrile-butadiene rubber, styrene-butadiene rubber and acrylic rubber may be used. Since the aqueous binder is economical, environmentally-friendly, harmless to a worker's health, and has a better cohesive effect, compared with the non-aqueous binder, a proportion of the active material per the same volume may be increased, and therefore, it is possible to exhibit higher capacity. As an aqueous binder, specifically, styrene-butadiene rubber may be used.

The binder may be included at 10 wt % or less, specifically, 0.1 to 10 wt % with respect to the total weight of the slurry for a negative electrode active material. When the content of the binder is less than 0.1 wt %, the effect according to the use of a binder is insignificant, which is not preferable, and when the content of the binder is more than 10 wt %, it is not preferable because a capacity per volume may be reduced according to a relative decrease in content of an active material, caused by an increase in binder content.

The conductive material is not particularly limited as long as it has conductivity without causing a chemical change in the battery, and for example, graphite such as natural graphite or artificial graphite; a carbon black type such as acetylene black, Ketjen black, channel black, furnace black, lamp black or thermal black; a conductive fiber such as a carbon fiber or a metal fiber; a metal powder such as fluorocarbon powder, aluminum powder or nickel powder; a conductive whisker consisting of zinc oxide or potassium titanate; a conductive metal oxide such as titanium oxide; or a conductive polymer such as a polyphenylene derivative may be used. A use amount of the conductive material may be 1 to 9 wt % with respect to the total weight of the slurry for a negative electrode active material.

The negative electrode current collector used in the negative electrode according to an exemplary embodiment of the present invention may have a thickness of 3 μm to 500 μm. The negative electrode current collector is not particularly limited as long as it has conductivity without causing a chemical change in a battery, and may be, specifically, copper, gold, stainless steel, aluminum, nickel, titanium, calcined carbon, or copper or stainless steel whose surface is treated with carbon, nickel, titanium or silver, or an aluminum-cadmium alloy. In addition, the negative electrode current collector may have fine irregularities in its surface so as to reinforce the binding strength of the negative electrode active material, and have various forms, such as a film, a sheet, a foil, a net, a porous body, a foam, a non-woven fabric, etc.

The positive electrode may be prepared by a conventional method known in the art. For example, a positive electrode may be prepared by preparing a slurry by mixing a positive electrode active material with a solvent, and if needed, a binder, a conductive material, or a dispersing agent, applying (coating) the slurry to a current collector formed of a metal material, and pressing and drying the coated current collector.

The current collector is formed of a conductive metal material, which is a metal to which the positive electrode active material slurry can be easily adhered, and the metal material is not particularly limited as long as it has high conductivity without causing a chemical change in the battery within the range of a battery voltage. For example, stainless steel, aluminum, nickel, titanium, calcined carbon, or aluminum or stainless steel whose surface is treated with carbon, nickel, titanium or silver may be used. In addition, the adhesive strength of the positive electrode active material may be raised by forming fine irregularities in the surface of the current collector. The current collector may have various forms such as a film, a sheet, a foil, a net, a porous body, a foam, a non-woven fabric, etc., and have a thickness of 3 to 500 μm.

The positive electrode active material may be, for example, a layered compound or a compound substituted with one or more transition metals selected from the group consisting of a lithium cobalt oxide ($LiCoO_2$), a lithium nickel oxide ($LiNiO_2$), and $Li[Ni_xCo_yMn_zM_v]O_2$ (wherein M is any one or two or more elements selected from the group consisting of Al, Ga and In; $0.3 \leq x < 1.0$, $0 \leq y$, $z \leq 0.5$, $0 \leq v \leq 0.1$, and x+y+z+v=1), $Li(Li_aM_{b-a-b}M'_b)O_{2-c}A_c$ (wherein $0 \leq a \leq 0.2$, $0.6 \leq b \leq 1$, $0 \leq b' \leq 0.2$, $0 \leq c \leq 0.2$; M includes Mn and one or more selected from the group consisting of Ni, Co, Fe, Cr, V, Cu, Zn and Ti; M' includes one or more selected from the group consisting of Al, Mg and B, and A includes one or more selected from the group consisting of P, F, S and N); a lithium manganese oxide such as $Li_{1+y}Mn_{2-y}O_4$ (wherein y is 0 to 0.33), $LiMnO_3$, $LiMn_2O_3$, or $LiMnO_2$; a lithium copper oxide ($Li_2CuO_2$); a vanadium oxide such as $LiV_3O_8$, $LiFe_3O_4$, $V_2O_5$, or $Cu_2V_2O_7$; a Ni-site lithium nickel oxide represented by $LiNi_{1-y}M_yO_2$ (wherein M is Co, Mn, Al, Cu, Fe, Mg, B or Ga, and y is 0.01 to 0.3); a lithium manganese composite oxide represented by $LiMn_{2-y}M_yO_2$ (wherein M=Co, Ni, Fe, Cr, Zn or Ta, y=0.01-0.1) or $Li_2Mn_3MO_8$ (wherein M=Fe, Co, Ni, Cu or Zn); $LiMn_2O_4$ in which some Li ions are substituted with alkaline earth metal ions; a disulfide compound; or $Fe_2(MoO_4)_3$, but the present invention is not limited thereto.

As a solvent for forming the positive electrode, an organic solvent such as N-methyl pyrrolidone (NMP), dimethyl formamide (DMF), acetone or dimethyl acetamide, or water may be used, and these solvents may be used alone or in a combination of two or more. The amount of the solvent used herein is sufficient to dissolve and disperse the positive electrode active material, the binder, and the conductive material in consideration of the coating thickness and the production yield of a slurry.

As the binder, a polyvinylidene fluoride-hexafluoropropylene copolymer (PVDF-co-HFP), polyvinylidene fluoride, polyacrylonitrile, polymethylmethacrylate, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene monomer (EPDM), a sulfonated EPDM, styrene butadiene rubber (SBR), fluoro rubber, polyacrylic acid, polymers in which hydrogen atoms of the above materials are substituted with Li, Na or Ca, or various copolymers may be used.

The conductive material is not particularly limited as long as it has conductivity without causing a chemical change in a battery, and for example, graphite such as natural graphite or artificial graphite; a carbon black type such as acetylene black, Ketjen black, channel black, furnace black, lamp black or thermal black; a conductive fiber such as a carbon fiber or a metal fiber; a conductive tube such as a carbon nanotube; a metal powder such as fluorocarbon powder, aluminum powder or nickel powder; a conductive whisker consisting of zinc oxide or potassium titanate; a conductive metal oxide such as titanium oxide; or a conductive material such as a polyphenylene derivative may be used. A use amount of the conductive material may be 1 to 20 wt % with respect to the total weight of a positive electrode slurry.

The dispersing agent may be an aqueous dispersing agent, or an organic dispersing agent such as N-methyl-2-pyrrolidone.

In addition, as a separator, a conventional porous polymer film conventionally used as a separator, for example, a porous polymer film made of a polyolefin-based polymer, such as an ethylene homopolymer, a propylene homopolymer, an ethylene/butene copolymer, an ethylene/hexene copolymer or an ethylene/methacrylate copolymer, or a stacked structure with two or more layers thereof may be used. Alternatively, a conventional porous non-woven fabric, for example, a non-woven fabric formed of a glass fiber with a high melting point or a polyethylene terephthalate fiber may be used, but the present invention is not limited thereto.

A lithium salt capable of being included as an electrolyte used in the present invention may be conventionally used in an electrolyte for a lithium secondary battery without limitation, and may be, for example, one or more selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$ may be used as an anion of the lithium salt.

As the electrolyte used in the present invention, an organic liquid electrolyte, an inorganic liquid electrolyte, a solid polymer electrolyte, a gel polymer electrolyte, a solid inorganic electrolyte, or a melt-type inorganic electrolyte, which can be used in the production of a lithium secondary battery, may be used, but the present invention is not limited thereto.

The type of the lithium secondary battery according to the present invention is not particularly limited, but may be a cylindrical type using a can, a prismatic type, a pouch type, or a coin type.

The lithium secondary battery according to the present invention may not only be used in a battery cell used as a power source of a small device, but also preferably used as a unit battery in medium-to large-sized battery modules including a plurality of battery cells.

Exemplary examples of the medium-to large-sized devices may include electric vehicles, hybrid electric vehicles, plug-in hybrid electric vehicles, systems for power storage, etc., but the present invention is not limited thereto.

MODE FOR CARRYING OUT THE INVENTION

Examples

Hereinafter, for clarity, the present invention will be described in further detail with reference to examples and experimental examples, but is not limited to the examples and experimental examples. However, the present invention may be implemented in a variety of different forms, and is not limited to the embodiments described herein. Examples of the present invention will be provided to more completely explain the present invention to those of ordinary skill in the art.

Examples 1 to 11

<Preparation of Silicon-Based Particle-Polymer Composite>

PAA having a weight average molecular weight (Mw) of 1,250,000 was dissolved in water, and subjected to acid-base neutralization titration using KOH, NaOH or LiOH for substitution of hydrogen atoms in a carboxyl group of the PAA. The metal substitution rate of hydrogen atoms in a carboxyl group of the PAA may be controlled by calculating a suitable equivalence ratio and performing a reaction using the same. The information on a substitution metal, the metal substitution rate and a polymer coating layer of the metal-substituted PAA used in each Example is shown in Table 1 below.

Particularly, for the substitution with KOH, the degree of neutralization was controlled to about 60%, for the substitution with NaOH, the degree of neutralization was controlled to about 80%, and for the substitution with LiOH, the degree of neutralization was controlled to about 100%. Since the above-mentioned degrees of neutralization are the most suitable degrees of neutralization for resolving the issue of aggregation of PAA by dissociating each alkaline source, silicon-based particles having a uniform polymer coating layer formed thereon may be prepared.

Silicon oxide particles having an average particle size of about 5 μm were immersed in each of the metal-substituted PAA solutions prepared as described above and then sufficiently stirred using a stirrer. A silicon-based particle-polymer composite was obtained by filtering the solution through a filter and drying the filtrate.

<Preparation of Negative Electrode>

Each of the silicon-based particle-polymer composites prepared in Examples 1 to 11 as a negative electrode active material, carbon black as a conductive material, and PAA as a binder were mixed in a weight ratio of 80:10:10, and then mixed with water ($H_2O$) as a solvent, thereby preparing a uniform slurry for a negative electrode active material. A copper current collector was coated with the prepared slurry for a negative electrode active material, dried, roll-pressed and punched to a regular size, thereby preparing a negative electrode.

<Preparation of Lithium Secondary Battery (Coin-Type Half-Cell)>

A coin-type half-cell was prepared by interposing a polyolefin separator between the negative electrode and a Li metal as a counter electrode, and injecting an electrolyte in which 1M $LiPF_6$ was dissolved in a solvent in which ethylene carbonate (EC) and ethyl methyl carbonate (EMC) were mixed in a volume ratio of 30:70.

Comparative Example 1

<Preparation of Silicon-Based Particle-Polymer Composite>

Silicon oxide particles coated with PAA were prepared by the same method as described in Examples 1 to 11, except that PAA not subjected to acid-base neutralization titration was used instead of the metal-substituted PAAs prepared in Examples 1 to 11.

<Preparation of Negative Electrode and Lithium Secondary Battery>

A negative electrode and a lithium secondary battery were prepared as described in Examples 1 to 11, except that the prepared PAA-coated silicon oxide particles were used as a negative electrode active material.

Comparative Example 2

A negative electrode and a lithium secondary battery were prepared as described in Examples 1 to 11, except that silicon oxide particles which were not coated with PAA were used as a negative electrode active material.

TABLE 1

| | Metal substituted in PAA | Metal substitution rate | Polymer coating layer |
|---|---|---|---|
| Example 1 | K | 60% | Single layer |
| Example 2 | Na | 80% | Single layer |
| Example 3 | Li | 100% | Single layer |
| Example 4 | Na | 50% | Single layer |
| Example 5 | Na | 70% | Single layer |
| Example 6 | Na | 90% | Single layer |
| Example 7 | Na | 100% | Single layer |
| Example 8 | Na | 60% | Single layer |
| Example 9 | Li | 80% | Single layer |
| Example 10 | Li | 30% | Single layer |
| Example 11 | K | 90% | Single layer |
| Comparative Example 1 | — | — | Single layer of PAA |
| Comparative Example 2 | — | — | — |

Experimental Example 1: Evaluation of Cycle Characteristic

Each of the batteries produced in Examples 1 to 11 and Comparative Examples 1 and 2 was charged at 25° C. at a constant current (CC) of 0.5 C up to 5 mV, and then first charging was performed at a constant voltage (CV) up to a charge current of 0.005 C (cut-off current). Afterward, the battery was maintained for 20 minutes, and then discharging was performed at a constant current (CC) of 0.5 C up to 1.5 V. The above process was performed repeatedly in $1^{st}$ to 50th cycles. The results are shown in Table 2, and the cycle characteristic of each of the batteries produced in Examples 1 to 3 and Comparative Examples 1 and 2 is also shown in FIG. 1.

Referring to FIG. 1 and Table 2, it can be confirmed that the battery including a silicon-based particle-polymer composite in which a polymer coating layer including metal-substituted PAA was formed on the silicon particles prepared in each of Examples 1 to 11 as a negative electrode active material exhibited an excellent cycle characteristic, compared with the batteries of Comparative Examples 1 and 2. In addition, the battery including a silicon-based particle-polymer composite in which a polymer coating layer including common PAA, rather than the metal-substituted PAA of Comparative Example 1, was formed as a negative electrode active material exhibited a relatively excellent cycle characteristic, compared with a battery including silicon-based particles in which the polymer coating layer of Comparative Example 2 was not formed as a negative electrode active material.

Meanwhile, although including a silicon-based particle-polymer composite on which a polymer coating layer was formed as a negative electrode active material, all of the batteries of Examples 1 to 11 and the battery of Comparative Example 1 had significant differences in terms of the cycle characteristic, which is caused by the uniformity of the polymer coating layer. Specifically, the uniform polymer coating layer formed on the surface of silicon-based particles can prevent or alleviate the pulverization of the silicon-based particles when the volume of the silicon-based particles is changed by the intercalation and deintercalation of lithium. In addition, when the polymer coating layer is uniformly formed on the surface of silicon-based particles, the silicon-based particles are effectively coated by the polymer coating layer, thereby suitably preventing a contact between the silicon-based particles and an electrolyte, resulting in effective prevention or alleviation of a side reaction of the electrolyte. As the silicon-based particle-polymer composite may achieve excellent conductivity and adhesion, it easily makes a reaction with lithium, and a negative electrode can exhibit an excellent lifespan characteristic, resulting in a difference in cycle characteristic.

Experimental Example 2: Measurement of Viscosity of PAA Solution

Viscosities of the metal-substituted PAA solutions used in Examples 1 to 11 and the PAA solution used in Comparative Example 1 were measured, and the result is shown in Table 2 below.

A Mooney viscosity was measured by detecting and reading values obtained 1 minute after pre-heating in a large rotor at 25° C. and 4 minutes after the operation of the rotor using a Mooney viscometer (MV2000, Alpha Technologies).

The viscosity was expressed as a relative viscosity of each of the metal-substituted PAA solutions of Examples 1 to 11 based on the viscosity of the PAA solution of Comparative Example 1 (100%).

Experimental Example 3: Evaluation of Thickness Expansion Rate of Electrode

To confirm the influence of the coating layer formed on the silicon-based particles after lithium was intercalated into the silicon-based particle-polymer composite on electrode expansion, the thickness expansion rate of an electrode was measured. The thickness of an electrode before charging was measured using a thickness gauge, and then after a coin-type cell was charged at 0.1C, the change in thickness of the electrode was measured and calculated. The result is shown in Table 2 below.

TABLE 2

|  | Viscosity (%) | Capacity retention (%) | Expansion rate (%) | Metal substituted in PAA | Metal substitution rate (%) |
|---|---|---|---|---|---|
| Example 1 | 650 | 43 | 45 | K | 60 |
| Example 2 | 700 | 53 | 41 | Na | 80 |
| Example 3 | 660 | 42 | 45 | Li | 100 |
| Example 4 | 680 | 45 | 44 | Na | 50 |
| Example 5 | 690 | 47 | 43 | Na | 70 |
| Example 6 | 690 | 47 | 43 | Na | 90 |
| Example 7 | 680 | 45 | 44 | Na | 100 |
| Example 8 | 610 | 36 | 48 | Na | 60 |
| Example 9 | 630 | 38 | 47 | Li | 80 |
| Example 10 | 630 | 38 | 47 | Li | 30 |
| Example 11 | 620 | 36 | 48 | K | 90 |
| Comparative Example 1 | 100 | 32 | 50 | — | — |
| Comparative Example 2 | — | 22 | 55 | — | — |

Referring to Table 2, compared with Comparative Example 1, it can be confirmed that the metal-substituted PAA solutions of Examples 1 to 11 had a significantly high viscosity, this is because the PAA is transformed into a stretched polymer chain due to a repulsive force in-between the polymer by dissociating an alkaline source, and thus the issue of aggregation was resolved. Moreover, the PAA solution substituted using a Na alkali source (Example 2) has the highest viscosity, and as shown in FIG. 1, the battery produced in Example 2 exhibited the most excellent lifespan characteristic, showing that there is a relationship between the viscosity of the PAA solution and cell performance.

In addition, referring to Table 2, Comparative Example 2 employing a negative electrode including silicon oxide particles exhibited an expansion rate of about 55%, and Comparative Example 1 employing a negative electrode composed of PAA-coated silicon oxide particles exhibited an expansion rate of about 50%.

Comparably, it was confirmed that Examples 1 to 11 employing a negative electrode composed of silicon oxide particles coated with metal-substituted PAA were significantly improved in expansion rate, compared with Comparative Examples 1 and 2.

The invention claimed is:

1. A silicon-based particle-polymer composite, comprising:
    silicon-based particles; and
    a polymer coating layer formed on the silicon-based particles,
    wherein the polymer coating layer comprises a metal-substituted poly(acrylic acid) in which 70 to 90% of hydrogen atoms of carboxyl groups are substituted with Na, and wherein a thickness of the polymer coating layer is 50 to 500 nm.

2. The composite according to claim 1, wherein the silicon-based particles comprise a mixture of one or more selected from the group consisting of Si, silicon oxide particles ($SiO_x$, $0<x\leq2$), a Si-metal alloy, and a silicon-carbon composite.

3. The composite according to claim 1, wherein an average particle size (D50) of the silicon-based particles is 0.05 to 30 μm.

4. The composite according to claim 1, wherein the polymer coating layer is a multi-layer in which two or more coating layers are stacked.

5. The composite according to claim 4, wherein each of the coating layers includes different metal-substituted poly (acrylic acid)s from each of other coating layer(s).

6. The composite according to claim 1, wherein the polymer coating layer includes pores having a diameter of 0.5 to 10 nm.

7. The composite according to claim 1, wherein the composite comprises the silicon-based particles at 70 to 99.9 parts by weight with respect to 100 parts by weight of the composite.

8. The composite according to claim 1, wherein the composite comprises the polymer coating layer at 0.1 to 30 parts by weight with respect to 100 parts by weight of the composite.

9. A negative electrode for a lithium secondary battery, comprising the silicon-based particle-polymer composite of claim 1.

10. A lithium secondary battery comprising the negative electrode of claim 9.

* * * * *